(12) United States Patent
Ali

(10) Patent No.: US 7,251,268 B2
(45) Date of Patent: Jul. 31, 2007

(54) RAKE RECEIVER

(75) Inventor: Danish Ali, South Croydon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 971 days.

(21) Appl. No.: 10/003,065

(22) Filed: Nov. 2, 2001

(65) Prior Publication Data

US 2002/0080862 A1 Jun. 27, 2002

(30) Foreign Application Priority Data

Nov. 22, 2000 (GB) ................................. 0028392.9

(51) Int. Cl.
*H04B 1/00* (2006.01)
*H04L 27/06* (2006.01)
(52) U.S. Cl. ...................... 375/150; 375/142; 375/152; 375/343
(58) Field of Classification Search ................ 375/150, 375/232, 144, 143, 142, 152, 148, 343, 346, 375/348, 349; 370/329, 335, 320, 342, 479, 370/308, 209, 441, 515; 455/52.3, 65, 296, 455/303; *H04B 1/707*
See application file for complete search history.

(56) References Cited

U.S. PATENT DOCUMENTS

| | | | |
|---|---|---|---|
| 6,201,828 B1 * | 3/2001 | El-Tarhuni et al. ......... | 375/150 |
| 6,363,105 B1 * | 3/2002 | Sourour et al. ............. | 375/150 |
| 6,570,918 B1 * | 5/2003 | Rademacher ............... | 375/232 |
| 6,633,553 B1 * | 10/2003 | Hwang ........................ | 370/329 |
| 6,807,222 B1 * | 10/2004 | Widdowson ................. | 375/147 |
| 6,816,542 B1 * | 11/2004 | Komatsu ..................... | 375/148 |
| 6,985,516 B1 * | 1/2006 | Easton et al. ............... | 375/150 |
| 2002/0051486 A1 * | 5/2002 | Aue ............................ | 375/150 |
| 2003/0214926 A1 * | 11/2003 | Choi et al. .................. | 370/335 |
| 2003/0223392 A1 * | 12/2003 | Iancu .......................... | 370/335 |
| 2004/0057506 A1 * | 3/2004 | Bultan et al. ................ | 375/148 |

FOREIGN PATENT DOCUMENTS

WO WO 01/05052 A1 * 1/2001
WO WO0105052 1/2002

OTHER PUBLICATIONS

By R. Price & P.E. Green Entitled: "A Communication Technique for Multipath Channel" 1958 Proceedings of the IRE pp. 555-570.
By J.J. Spiklker, Jr. Entitled: "Delay-Lock Tracking of Binary Signals" 1962 IEEE Transactions on Space Electronics and Telemetry, 9 (1963) pp. 1-8.

* cited by examiner

*Primary Examiner*—Kevin Kim
*Assistant Examiner*—Linda Wong

(57) ABSTRACT

A Rake receiver suitable for receiving, for example, direct sequence CDMA signals, in which the pilot code used to correlate the received signal in each Rake finger (RF1, RF2, RFN) is interpolated prior to the correlation.

4 Claims, 4 Drawing Sheets

RAKE RECEIVER

Figure 1:
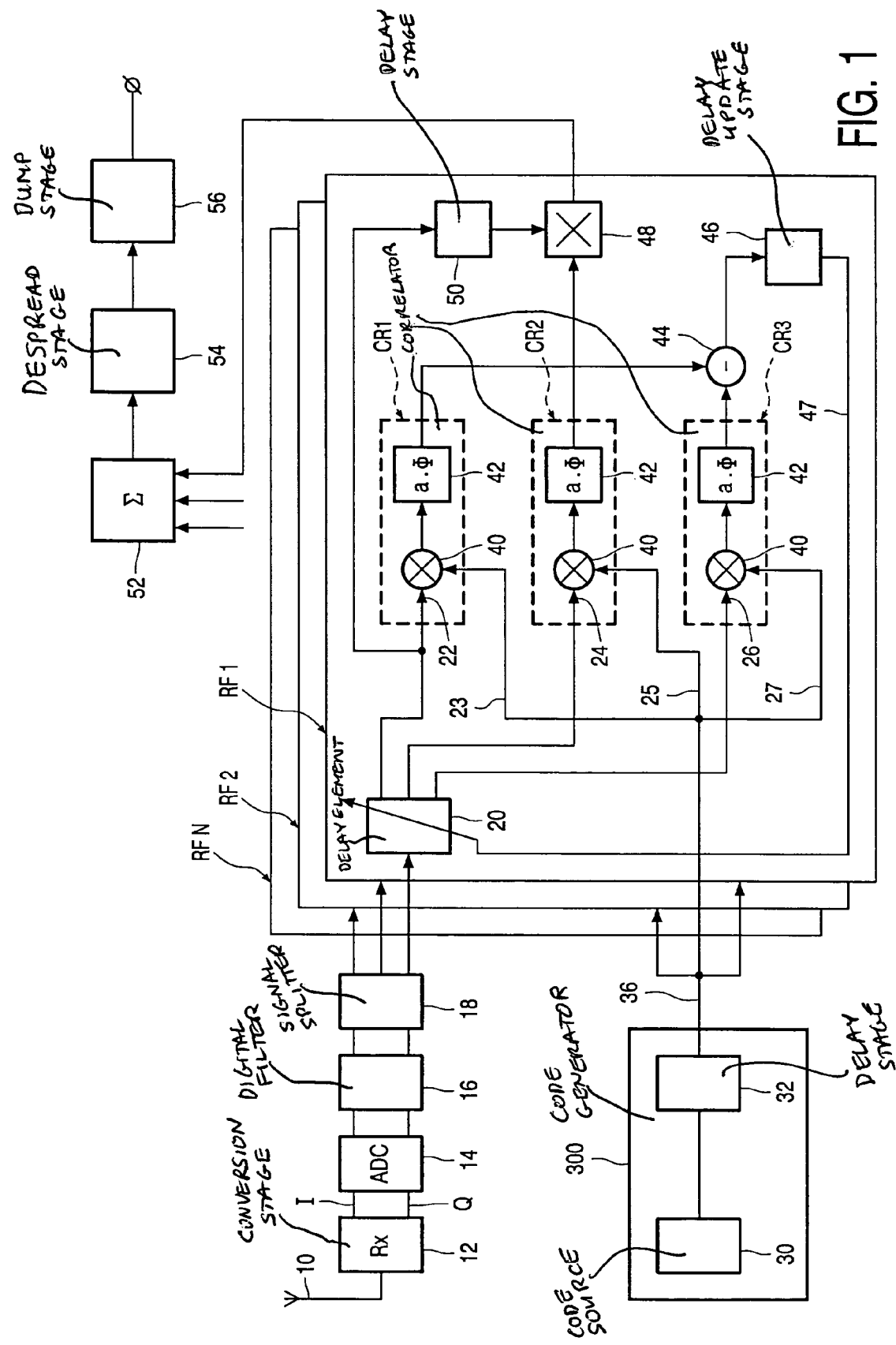

The present invention relates to a Rake receiver having particular, but not exclusive, application as a direct-sequence CDMA (code division multiple access) receiver suitable for use in IS95 and third generation (3 GPP) telephones.

The Rake receiver is known from article by R. Price and P. E. Green, "A Communication Technique for Multipath Channel" 1958 Proceedings of the IRE pp 555 to 570. In simple terms a Rake receiver architecture provides an effective immunity to the effects of inter-symbol interference (ISI) in the presence of multipath propagation conditions which cause the same signal to be repeatedly received at an antenna at a plurality of different time intervals. The received signal is received and frequency down-converted and the down-converted signals are applied to a plurality of signal paths, frequently called Rake fingers, each having a different time delay. Each signal path includes a correlator which produces its version of the received signal. The versions are combined and integrated over a symbol period.

In earlier versions of the Rake receiver the delays were provided by a delay line having a plurality of taps, successive taps being separated by substantially equal time delays. Only a small number of the signal paths contribute energy to the received symbol and the relative delays of these paths vary slowly with time.

A more modern version of the disclosed Rake receiver has fewer taps but each has a variable delay. The optimum delay for each tap is maintained by a delay-locked loop. A typical delay-locked loop is disclosed in an article by J. J. Spilker, Jr. "Delay-Lock Tracking of Binary Signals" 1963 IEEE Transactions on Space Electronics and Telemetry, 9(1963) pages 1 to 8. In an implementation of a delay-locked loop for use in a direct-sequence CDMA receiver the transmitted signal includes a pilot code and at the Rake receiver a frequency down-converted signal in each of the signal paths is correlated with a locally generated version of the pilot code. The correlation is done a fraction of a chip early and also a fraction of a chip late and the delay of the delay-locked loop is adjusted in the direction of the more favourable correlation. This technique gives an early-late gate for time tracking. The optimal delay, halfway between the early and late signals, is multiplied with the output of the delayed lock loop and is combined with outputs from the other signal paths (or Rake fingers) for optimal decoding of the wanted signal.

Modern implementations of a Rake receiver are digital and the output signal from the receiver/ADC is therefore digital being both level-discrete and time-discrete. It has been found in the case of 3GPP that in order to extract most of the energy from a given signal path, the time delay in that path should be controllable to a fraction of a chip, typically ¼ of a chip, so the sampling rate of the ADC needs to be at least four times the chip rate, the signal bandwidth being roughly half the chip rate. In order to prevent adjacent channel signals from interfering with the operation of the delay-locked loop, the signal from the receiver/ADC needs to be filtered of the order of 4 times more strongly than would be required by its sampling rate. Such strong filtering is wasteful of resources, such as the component count and current consumption, as larger integration time constants will be required for analogue filtering prior to analogue to digital conversion and/or a larger number of taps will be required for digitally filtering of oversampled ADCs.

An object of the present invention is to reduce the effects of adjacent channel interference in a cost effective manner.

According the present invention there is provided a Rake receiver comprising a radio signal receiving stage, an analogue-to-digital converter (ADC) coupled to the receiving stage, the ADC output being coupled to an input of each of a plurality of signal paths each of the signal paths including signal processing means, combining means for combining outputs from the signal paths and means for recovering symbols from the combined outputs, the receiver further comprising code generation means for generating a filtered pilot code, and the signal processing means in each of the signal paths comprising a variable delay means for delaying a signal in that path by a desired amount and a means for correlating the delayed signal with the filtered pilot code.

The present invention is based on the realisation that interference from out-of-band signals only occurs because the pilot code, which comprises a sequence of +1 and −1 values, has harmonics which occur outside the signal bandwidth. Filtering the pilot code signal, which may be implemented by interpolating the pilot code signal which starts as ±1 values, gives it a multibit representation and is much easier than filtering the received signal in a higher order filter than is justified by the chip rate.

In an embodiment of the invention the signal processing means includes signal deriving means coupled to an output of the code generation means and to the variable delay means for deriving an early-late timing error signal for the signal path, which timing error signal is supplied to means for adjusting the variable time delay of the variable delay means and for deriving an indication of the strength of the received signal in the respective signal path, and means for multiplying the delayed signal from the variable delay means by the complex conjugate of the indication of its strength and applying the result to the combining means.

In a further embodiment of the invention the code generation means comprises fixed delay means and the signal deriving means comprises first, second and third correlators, each of the first, second and third correlators having first and second inputs, the first input of the first correlator being coupled to the output of the variable delay means, first and second differential delay means having inputs coupled to the output of the variable delay means and outputs coupled respectively to the first inputs of the second and third correlators, the first differential delay means delaying the output of the variable delay means by half a chip period and the second differential delay means delaying the output of the variable delay means by a chip period, second inputs of the first, second and third correlators being coupled to an output of the code generation means, a differencing circuit having inputs connected respectively to outputs of the first and third correlators and an output for the early-late timing error signal, and the second correlator having an output for the indication of the strength of the received signal in the signal path.

Figure 2:
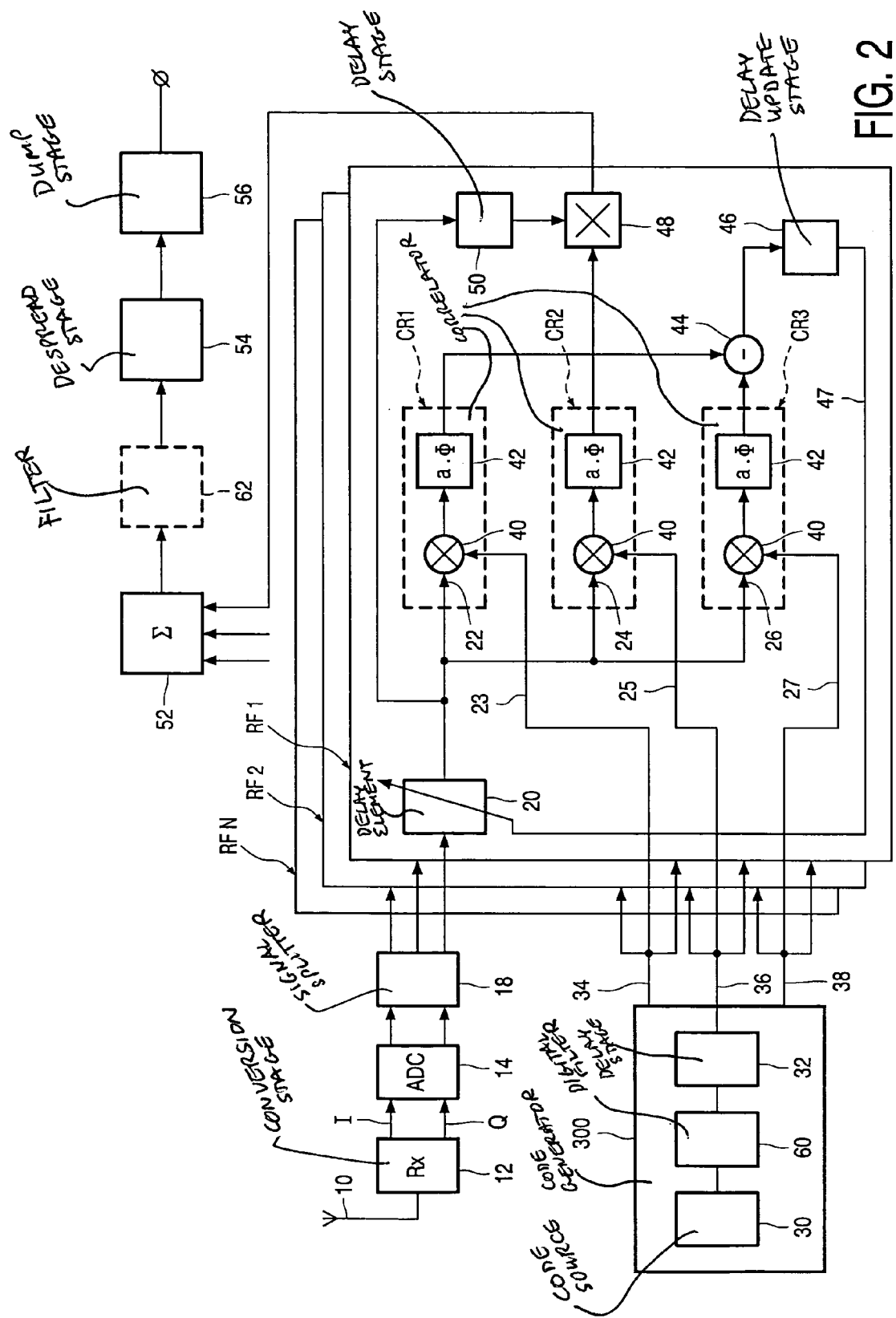
Figure 3:
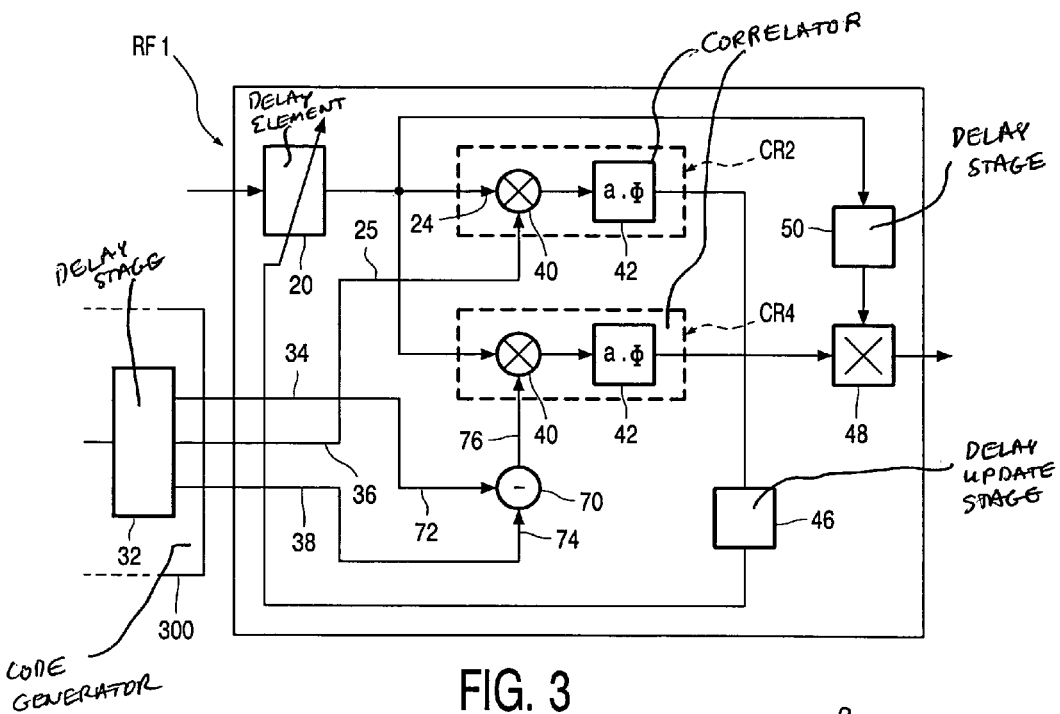
Figure 4:
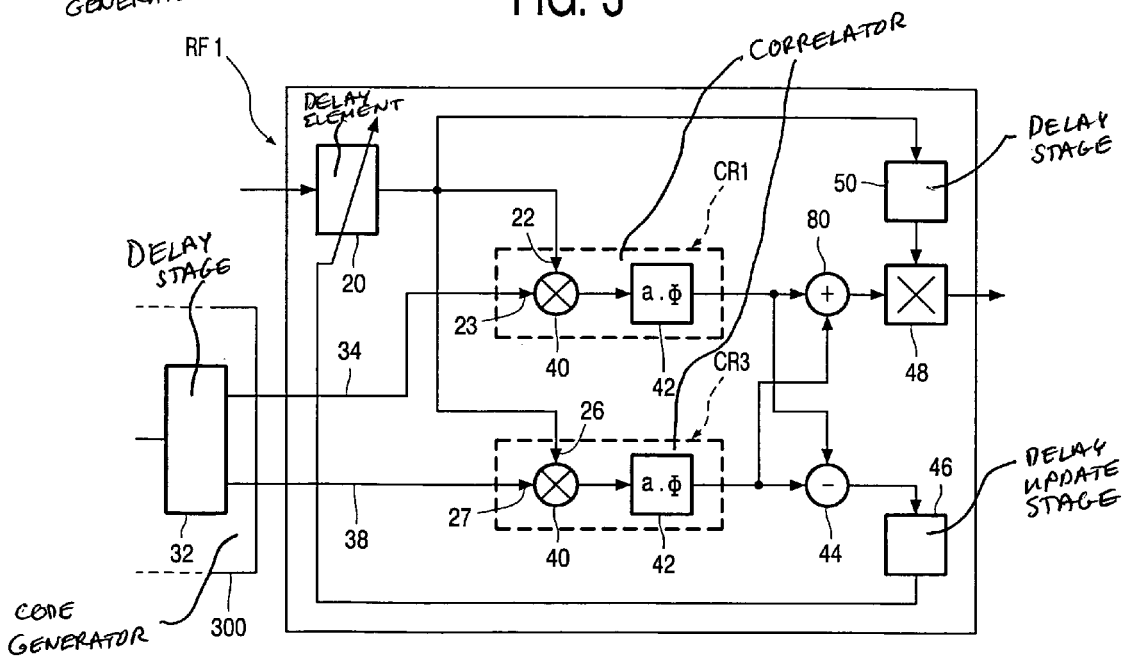
Figure 5:
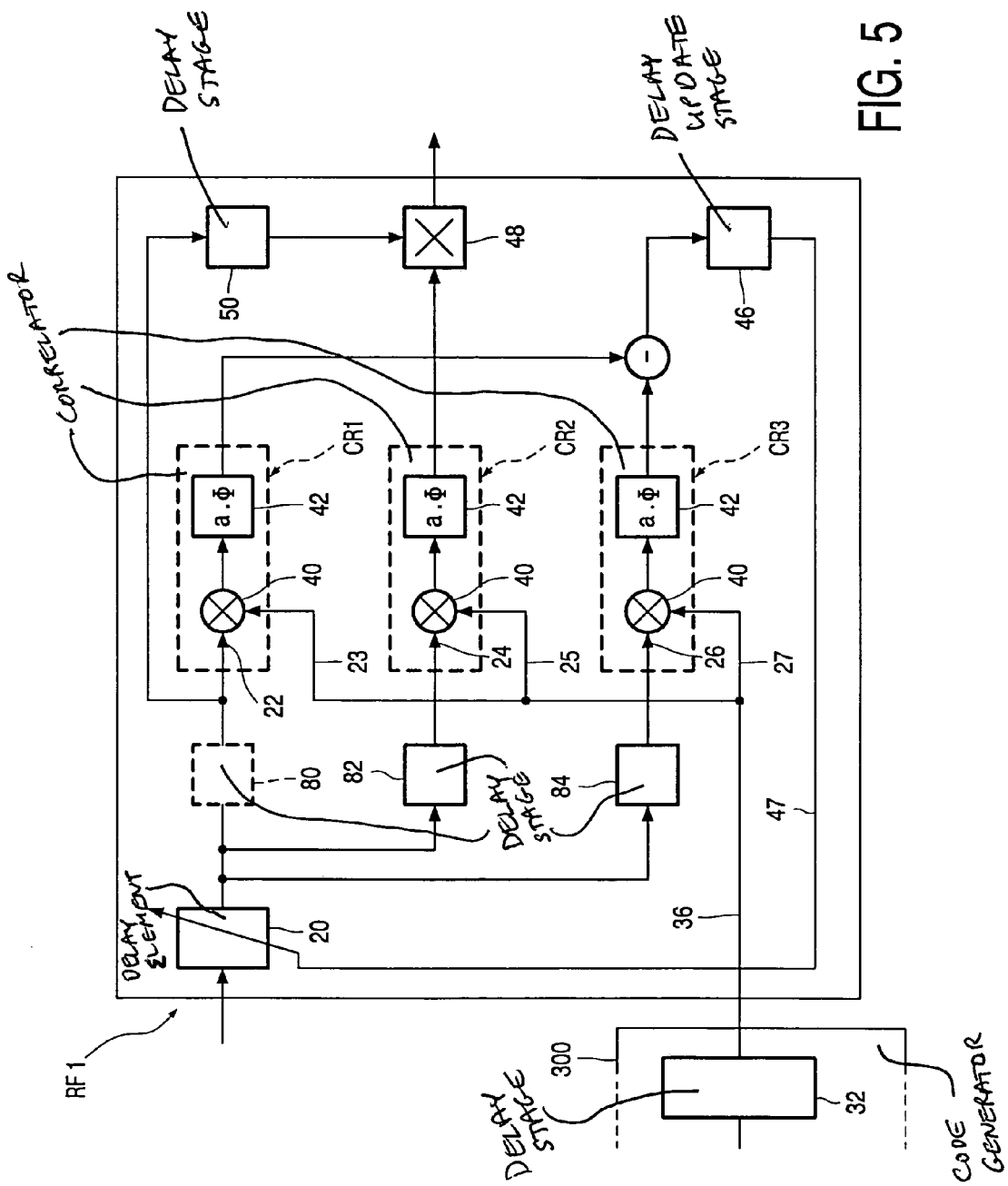

The present invention will now be described, by way of example, with reference to the accompanying drawings, wherein:

FIG. 1 is a block schematic diagram of a Rake receiver having high order filtering of the digitised received signal, FIG. 2 is a block schematic diagram of a first embodiment of a Rake receiver made in accordance with the present invention, FIG. 3 is a block schematic diagram of an embodiment of a signal path (or Rake finger) suitable for use in the receiver shown in FIG. 2, FIG. 4 is a block schematic diagram of another embodiment of a signal path (or Rake finger) suitable for use in the receiver shown in FIG. 2, and FIG. 5 is a block schematic diagram of a further embodiment of a signal path (or Rake finger) which is a variant of that shown in FIG. 2.

In the drawings, the same reference numerals have been used to indicate corresponding features.

The Rake receiver shown in FIG. 1 comprises an antenna 10 coupled to a quadrature frequency down conversion stage 12 which provides quadrature related outputs I,Q. These outputs are digitised in an analogue-to-digital converter (ADC) 14. The digitised I and Q signals are applied to a high order digital filter 16 which is necessary to cope with the dynamic range of the received signals. An output of the digital filter 16 is applied to a signal splitter 18 which splits the signal into a plurality of N parallel signal paths, generally known as Rake fingers, RF1, RF2, RFN. Each of the N signal paths is the same as the others and for convenience of description the signal path RF1 will be described in detail. Logic control is applied to the Rake fingers RF1, RF2, RFN so that no two fingers track the same signal path, and the logic control reallocates fingers should a given signal path fade away and another one be formed.

The signal from the signal splitter 18 is applied to a variable delay element 20. The delay of the variable delay element 20 is adjusted to optimise the signal being processed in the signal path RF1. The variable delay element 20 provides three signal outputs, namely early, on-time and late, which are coupled respectively to first inputs 22, 24, 26 of three correlators CR1, CR2 and CR3.

A code generation means 300 comprises a source of pilot code 30 coupled to a fixed delay stage 32 which provides an output 36 and which is connected to second inputs 23, 25 and 27 of the correlators CR1, CR2 and CR3.

Each of the three correlators CR1, CR2, CR3 comprises a multiplier 40 for multiplying the signals on the respective first and second inputs and a stage 42 for determining the amplitude, a, and the phase, ø, of the signal from the multiplier 40. Early and late outputs from the correlators CR1, CR3 are applied to a differencing stage 44 from which an early-late timing error for the Rake finger RF1 is determined and applied to a stage 46 which decides if the delay of the variable delay element 20 should be updated and if so it sends a signal on a line 47. The timing error is generally compared to a threshold and if it exceeds the threshold the delay is adjusted, otherwise it is left as it is. The combination of the variable delay element 20 and the generation of the feedback signal on the line 47 constitute a delay lock loop.

An on-time output of the correlator CR2 is applied to a multiplier 48 which also receives the signal from the delay element 20. This signal is delayed in a delay stage 50 by an amount to compensate for the processing of the signals in the correlator CR2. In the multiplier 48 the signal from the delay stage 50 is multiplied by the complex conjugate of the correlation obtained from the correlator CR2 to provide a best version of the signal. This best signal is combined maximally with the best signals from the other Rake fingers RF2, RFN in a summation stage 52 and the sum signal is applied to a despread stage 54. The signal obtained is applied to an integrate and dump stage 56 in which the symbols are recovered.

In the case of using the circuit of FIG. 1 for 3GPP telephones, in order to extract most of the energy from a given path, the finger delay should be controllable to a fraction of a chip, typically a ¼ of a chip, so the sampling rate of the ADC14 has to be at least four times the chip rate to provide 4 samples per chip. The signal bandwidth is of the order of half the chip rate. To prevent adjacent channels from interfering with the operation of the Rake fingers RF1, RF2, RFN, the signal from the ADC 14 must be filtered four times more strongly in the filter 16 than would be required by its sampling rate. The use of a high order filter is wasteful of resources. Such a filter requires larger integration time constants for analogue filtering before analogue to digital conversion in the ADC16 and/or a larger number of taps for digital filtering of oversampled ADCs. Apart from such filtering requiring a relatively large area of an integrated circuit, it will also consume a relatively large power which will adversely affect the talk time/standby time of the telephone.

FIG. 2 shows an embodiment of a Rake receiver made in accordance with the present invention. Compared to FIG. 1, the illustrated Rake receiver includes a digital filter 60 for interpolating the pilot code from the source of pilot code 30 prior to it being applied to the fixed delay stage 32. Optionally a filter 62 may be connected between the output of the summation stage 52 and the input of the despread stage 54 in order to remove harmonics present in the output of the ADC 14. Alternatively filtering may be implicit in the despread stage 54. Filtering of the despread signal may not be too severe because the spreading code has less harmonic energy. The high order digital filter 16 (FIG. 1) is omitted although some analogue filtering may be carried out in the receiver 12 and the ADC 14. The output from the variable delay element 20 is supplied to the first inputs 22, 24, 26 of the correlators CR1, CR2 and CR3. The fixed delay stage 32 has early, on-time and late outputs 34, 36, 38 which are supplied to the second inputs of the respective correlators CR1, CR2 and CR3. In the interests of brevity FIG. 2 will not be described in detail as it is similar to FIG. 1.

In operation the ADC 14 oversamples the I and Q signals at 4 times the chip rate and the correlators CR1, CR2 and CR3 are also operating at 4 times the chip rate to avoid aliasing. The output from the variable delay element 20 is at the chip rate and the output from the correlator CR2 gives the amplitude, a, and the phase, φ, values of the on-time pilot. More particularly the stage 42 of the correlator CR2 integrates and dumps the applied signals and optionally interpolates the output to provide a signal at lower than the chip rate and perhaps slower than the symbol rate.

FIG. 2 is based on the realisation that the interference from out-of-band signals only occurs because the pilot code produced by the source of pilot code 30, which code is a sequence of +1 and −1 values, has harmonics that occur outside the signal bandwidth. By digitally interpolating the pilot code in the digital filter means 60 the pilot code is given a multibit representation and the out-of-band harmonics are removed. Since the pilot code starts as a sequence of ±1 values, interpolating is much easier and uses less resources than filtering the received signal in a high order filter, such as the filter 16 (FIG. 1). There is a trade-off between the degree of filtering that is done to the received signal and the degree of filtering of the pilot code. Factors which have to be considered in this trade-off include the complexity of the filters in the signal path as opposed to an increased degree of interpolation of the pilot code resulting in a large number of bits leading to complicated multiplications in the correlators CR1, CR2, CR3. As a guide, the degree of filtering of the signal path is adjusted to prevent aliasing and the balance of the filtering requirement is achieved by interpolating the pilot code.

Since the interpolated pilot code from the digital filter 60 is no longer ±1, the multiplications inside the correlators CR1, CR2, CR3 become true multiplications at the sample rate rather than additions or subtractions. There are simplications which can be made to reduce signal processing because the number of interpolated pilot values is small.

The stages 42 of the correlators CR1, CR2, CR3 comprise integrate and dump stages which provide implicit filtering of the signals.

FIG. 3 illustrates a variant of the Rake finger RF1 from that shown in FIG. 2. The variant relates to the method of determining the early-late signal to be applied to the variable delay element 20. The early and late outputs 34, 38 of the fixed delay stage 32 are applied to inputs 72, 74, respectively, of a differencing stage 70. An output 76 of the stage 70 and the delayed received signal from the variable delay element 20 are applied to a correlator CR4 comprising a multiplier 40 and a phase, ø, and amplitude, a, determining stage 42. An output of the stage 42 is coupled to the stage 46.

FIG. 4 shows another variant of the Rake finger RF1 shown in FIG. 2. In this embodiment the early and late outputs 34, 38 of the fixed delay stage 32 are applied to their respective correlators CR1, CR3 and the difference of their outputs is generated by difference means 44 and used by the stage 46 to generate a delay adjustment signal for the delay element 20. The on-time correlation is derived by summing the early and late correlations in a summation stage 80, the output of which forms the complex conjugate of the on-time correlation. The delayed received signal is multiplied with the complex conjugate in the multiplier 48.

FIG. 5 illustrates a further variant of the Rake finger RF1 from that shown in FIG. 2. In this embodiment a single output 36 from the fixed delay stage 32 is applied to inputs 23, 25, 27 of the multipliers 40 of the correlators CR1, CR2, CR3, respectively. The output of the variable delay element 20 is applied to time delay stages 82 and 84 whose outputs are respectively connected to inputs 24 and 26 of the multipliers 40 of the correlators CR2 and CR3. The delay stage 82 delays the output of the delay element 20 by 2 samples (or half a chip period) and the delay stage 84 delays the output of the delay element 20 by 4 samples (or a chip period). Normally the output of the delay element 20 is connected directly to the input 22 of the multiplier 40 in the correlator CR1 so that there is no signal delay. Alternatively a delay stage 80 shown in broken lines may be provided if required, but the relative time delay periods introduced by the delay stages 82, 84 are maintained. In operation the correlator CR1 provides the early indication, the correlator CR2 provides the on-time indication and the correlator CR3 provides the late indication. The siglal processing thereafter is the same same as described with reference to FIG. 2.

The invention claimed is:

1. A Rake receiver comprising a radio signal receiving stage, an analogue-to-digital converter (ADC) coupled to the receiving stage, the ADC output being coupled to an input of each of a plurality of parallel signal paths each of the parallel signal paths including signal processing means, combining means for combining outputs from the signal paths and means for recovering symbols from the combined outputs, the receiver further comprising code generation means for generating a filtered pilot code that provides a multibit interpolation of a generated pilot code prior to the parallel signal paths, and the signal processing means in each of the parallel signal paths comprising a variable delay means for delaying a signal in that path by a desired amount and a means for correlating the delayed signal with the filtered pilot code, wherein the signal processing means includes signal deriving means coupled to an output of the code generation means and to the variable delay means for deriving an early-late timing error signal for the signal path, wherein the timing error signal is supplied to means for both adjusting the variable time delay of the variable delay means and for deriving an amplitude and phase of the received signal in the respective signal path, and the timing error signal is further supplied to means for multiplying the delayed signal from the variable delay means by the complex conjugate of the amplitude and phase of the received signal and applying the result to the combining means, characterised in that the code generation means comprises early, on-time and late outputs of the filtered pilot code and the signal deriving means comprises differencing means having inputs connected respectively to the early and late outputs of the code generation means, first and second correlators, each of the first and second correlators having first and second inputs, the first inputs being coupled to the output of the variable delay means and the second inputs being connected respectively to the on-time output of the code generation means and to an output of the differencing means, the first correlator having an output for the amplitude and phase of the received signal in the signal path and the second correlator having an output for the early-late timing error signal.

2. A Rake receiver as claimed in claim 1, characterised in that each of the first and second correlators includes an integrate and dump stage.

3. A Rake receiver comprising a radio signal receiving stage, an analogue-to-digital converter (ADC) coupled to the receiving stage, the ADC output being coupled to an input of each of a plurality of parallel signal paths each of the parallel signal paths including signal processing means, combining means for combining outputs from the signal paths and means for recovering symbols from the combined outputs, the receiver further comprising code generation means for generating a filtered pilot code that provides a multibit interpolation of a generated pilot code prior to the parallel signal paths, and the signal processing means in each of the parallel signal paths comprising a variable delay means for delaying a signal in that path by a desired amount and a means for correlating the delayed signal with the filtered pilot code, wherein the signal processing means includes signal deriving means coupled to an output of the code generation means and to the variable delay means for deriving an early-late timing error signal for the signal path, wherein the timing error signal is supplied to means for both adjusting the variable time delay of the variable delay means and for deriving an amplitude and phase of the received signal in the respective signal path, and the timing error signal is further supplied to means for multiplying the delayed signal from the variable delay means by the complex conjugate of the amplitude and phase of the received signal and applying the result to the combining means, characterised in that the code generation means comprises early and late outputs of the filtered pilot code and the signal deriving means comprises first and second correlators, each of the first and second correlators having first and second inputs, the first inputs being coupled to the output of the variable delay means and the second inputs being connected respectively to the early and late outputs of the code generation means, differencing means having inputs coupled respectively to outputs of the first and second correlators and an output for the early-late timing error signal and combining means having inputs coupled respectively to outputs of the first and second correlators and an output for the amplitude and phase of the received signal in the signal path.

4. A Rake receiver comprising a radio signal receiving stage, an analogue-to-digital converter (ADC coupled to the receiving stage, the ADC output being coupled to an input of each of a plurality of parallel signal paths each of the parallel signal paths including signal processing means, combining means for combining outputs from the signal paths and means for recovering symbols from the combined outputs, the receiver further comprising code generation means for generating a filtered pilot code that provides a multibit interpolation of a generated pilot code prior to the parallel signal paths, and the signal processing means in each of the parallel signal paths comprising a variable delay means for delaying a signal in that path by a desired amount and a means for correlating the delayed signal with the filtered pilot code, wherein the signal processing means includes signal deriving means coupled to an output of the code generation means and to the variable delay means for deriving an early-late timing error signal for the signal path, wherein the timing error signal is supplied to means for both adjusting the variable time delay of the variable delay means and for deriving an amplitude and phase of the received signal in the respective signal path, and the timing error signal is further supplied to means for multiplying the delayed signal from the variable delay means by the complex conjugate of the amplitude and phase of the received signal and applying the result to the combining means, characterised in that the code generation means comprises fixed delay means and the signal deriving means comprises first, second and third correlators, each of the first, second and third correlators having first and second inputs, the first input of the first correlator being coupled to the output of the variable delay means, first and second differential delay means having inputs coupled to the output of the variable delay means and outputs coupled respectively to the first inputs of the second and third correlators, the first differential delay means delaying the output of the variable delay means by half a chip period and the second differential delay means delaying the output of the variable delay means by a chip period, second inputs of the first, second and third correlators being coupled to an output of the code generation means, a differencing means having inputs connected respectively to outputs of the first and third correlators and an output for the early-late timing error signal, and the second correlator having an output for amplitude and phase of the received signal in the signal path.

\* \* \* \* \*